US012661886B2

(12) United States Patent
Tamenaga

(10) Patent No.: US 12,661,886 B2
(45) Date of Patent: Jun. 23, 2026

(54) LIQUID EJECTION UNIT AND MANUFACTURING METHOD OF THE SAME

(71) Applicant: CANON KABUSHIKI KAISHA, Tokyo (JP)

(72) Inventor: Zentaro Tamenaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/365,464

(22) Filed: Aug. 4, 2023

(65) Prior Publication Data

US 2024/0051296 A1 Feb. 15, 2024

(30) Foreign Application Priority Data

Aug. 9, 2022 (JP) ................................ 2022-127262

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1623* (2013.01); *B41J 2002/14491* (2013.01); *B41J 2202/22* (2013.01)

(58) Field of Classification Search
CPC ...... B41J 2/14233; B41J 2/161; B41J 2/1623; B41J 2002/14491; B41J 2202/22; B41J 2/1607; B41J 2/14201
See application file for complete search history.

(56) References Cited

U.S. PATENT DOCUMENTS 7,407,270 B2 8/2008 Furuhata
8,342,654 B2 1/2013 Kawamura
(Continued)

FOREIGN PATENT DOCUMENTS

JP 3-109747 A 5/1991
JP 4-120745 A 4/1992
(Continued)

OTHER PUBLICATIONS

Extended European Search Report dated Dec. 19, 2023, in European Patent Application No. 23190230.5.
(Continued)

*Primary Examiner* — Lisa Solomon
(74) *Attorney, Agent, or Firm* — Venable LLP

(57) ABSTRACT

A manufacturing method of a liquid ejection unit includes: arranging an electric wiring board on a print element board such that the electric wiring board abuts the print element board, the print element board including an ejection port configured to eject liquid, an energy generating element configured to generate energy for ejecting the liquid from the ejection port, and an electrode pad electrically connected to the energy generating element, the electric wiring board including a terminal for electrical connection to the electrode pad; connecting the electrode pad and the terminal to each other by using an electric connection member; and covering an electric connection portion with a sealing agent, the electric connection portion including at least the electric connection member, the electrode pad, and the terminal, in which in the connecting, the electric connection member is shaped to include at least one bending point.

9 Claims, 21 Drawing Sheets

(56) References Cited

U.S. PATENT DOCUMENTS

| | | | | |
|---|---|---|---|---|
| 8,517,517 | B2 | 8/2013 | Abe et al. | |
| 8,519,551 | B2 * | 8/2013 | Osajima | H10D 89/00 257/786 |
| 9,248,647 | B2 | 2/2016 | Iwanaga et al. | |
| 9,352,562 | B2 | 5/2016 | Takahashi et al. | |
| 9,539,808 | B2 | 1/2017 | Tamenaga et al. | |
| 9,950,511 | B2 | 4/2018 | Dodd et al. | |
| 10,065,418 | B2 | 9/2018 | Takahashi | |
| 2009/0135569 | A1 | 5/2009 | Williams et al. | |
| 2010/0271431 | A1 | 10/2010 | Kawamura et al. | |
| 2011/0310163 | A1 | 12/2011 | Abe et al. | |
| 2014/0022305 | A1 | 1/2014 | Kida | |
| 2017/0326876 | A1 * | 11/2017 | Otaka | B41J 2/14 |
| 2020/0331271 | A1 | 10/2020 | Takahashi et al. | |

FOREIGN PATENT DOCUMENTS

| | | | |
|---|---|---|---|
| JP | 10-4113 | A | 1/1998 |
| JP | 2002-343823 | A | 11/2002 |
| JP | 2009-154432 | A | 7/2009 |
| JP | 2010-253766 | A | 11/2010 |
| JP | 2012-000838 | A | 1/2012 |
| JP | 2014-154709 | A | 8/2014 |
| JP | 2017-024276 | A | 2/2017 |
| JP | 2020-066234 | A | 4/2020 |
| WO | 03/078167 | A1 | 9/2003 |
| WO | 2009/084100 | A1 | 7/2009 |

OTHER PUBLICATIONS

Office Action dated Oct. 15, 2024, in Japanese Patent Application No. 2022-127262.

Office Action dated Mar. 12, 2024, in Japanese Patent Application No. 2022-127262.

Office Action dated Jun. 18, 2024, in Japanese Patent Application No. 2022-127262.

* cited by examiner

| HEIGHT | BENDING (SHORT) | BENDING (LONG) | SHAPE |
|---|---|---|---|
| SAME | ABSENT | ABSENT |  2101 |
| | | PRESENT |  2102 |
| | PRESENT | ABSENT |  2103 |
| | | PRESENT |  2104 |
| HIGH (SHORT) LOW (LONG) | ABSENT | ABSENT |  2105 |
| | | PRESENT |  2106 |
| | PRESENT | ABSENT |  2107 |
| | | PRESENT |  2108 |
| LOW (SHORT) HIGH (LONG) | ABSENT | ABSENT |  2109 |
| | | PRESENT |  2110 |
| | PRESENT | ABSENT |  2111 |
| | | PRESENT |  2112 |

LIQUID EJECTION UNIT AND MANUFACTURING METHOD OF THE SAME

BACKGROUND OF THE INVENTION

Field of the Invention

The present disclosure relates to a liquid ejection unit and a manufacturing method of the same.

Description of the Related Art

Application of a liquid ejection unit includes, for example, an inkjet printing apparatus. The liquid ejection unit used in the inkjet printing apparatus is referred to as an inkjet head. The inkjet head is used to eject ink as liquid to a print medium. The inkjet head thus includes a print element board including energy generating elements configured to generate energy for ejecting the ink. In this case, in order to drive the energy generating elements, the print element board needs to receive supply of electric power from the outside via an electric wiring board or the like. Accordingly, the print element board provided with the energy generating elements is provided with electrode pads. Moreover, the print element board is electrically connected to an electric wiring board such as a flexible printed circuit (FPC) or a tape automated bonding (TAB).

U.S. Pat. No. 9,950,511 (hereinafter, referred to as Literature 1) discloses electrically connecting lead portions of an electric wiring board and electrode pads of a print element board by wire bonding in a liquid ejection unit. Literature 1 also discloses protecting an electric connection portion by using a sealing agent, the electric connection portion including terminals provided in end portions of the lead portions of the electric wiring board, the electrode pads of the print element board, and wires connecting the terminals and the electrode pads to one another.

In a case where each wire has a normal loop shape in which the wire bends at a continuous curvature over the entirety thereof, the following disadvantage occurs. Specifically, after the wire bonding, the wire is elastically deformed with a first bonding portion on the electrode pad as a fulcrum. Thus, there is a possibility that the reaction force of the wire attempting to return to a linear shape lifts the electric wiring board, and a gap is formed between the print element board and the electric wiring board. Then, in a case where the sealing agent is applied, there is a possibility that the sealing agent flows out from this gap, and this flow-out makes protection of the electrode connection portion unstable and impairs the reliability of the electric connection portion.

SUMMARY OF THE INVENTION

A manufacturing method of a liquid ejection unit includes: arranging an electric wiring board on a print element board such that the electric wiring board abuts the print element board, the print element board including an ejection port configured to eject liquid, an energy generating element configured to generate energy for ejecting the liquid from the ejection port, and an electrode pad electrically connected to the energy generating element, the electric wiring board including a terminal for electrical connection to the electrode pad; connecting the electrode pad of the print element board and the terminal of the electric wiring board to each other by using an electric connection member; and covering an electric connection portion with a sealing agent, the electric connection portion including at least the electric connection member, the electrode pad, and the terminal, in which in the connecting, the electric connection member is shaped to include at least one bending point.

Further features of the present invention will become apparent from the following description of exemplary embodiments with reference to the attached drawings.

DESCRIPTION OF THE EMBODIMENTS

Next, embodiments of the present disclosure are described with reference to the drawings. A liquid ejection unit based on the present disclosure includes at least a print element board and an electric wiring board. The print element board includes ejection ports that eject liquid, energy generating elements that generate energy for ejecting the liquid from the ejection ports, and electrode pads that are electrically connected to the energy generating elements. The electric wiring board is electrically connected to the electrode pads of the print element board. Although several embodiments of the liquid ejection unit as described above based on the present disclosure are described below, these embodiments are not intended to limit the scope of the present disclosure.

Although energy generating elements using, for example, a thermal method or a piezoelectric method can be used as the energy generating elements in each embodiment, the present disclosure is not limited to these methods. The thermal method is a method using a liquid ejection unit that ejects the liquid from the ejection ports by applying heat to the liquid and generating air bubbles by using electrothermal convertors. The piezoelectric method is a method using a liquid ejection unit that uses piezoelectric elements whose volumes change upon application of voltage thereto and that eject the liquid by using pressure generated by the volume change.

Particularly, the present disclosure can be preferably used in the liquid ejection unit of the piezoelectric method that uses the piezoelectric elements as the energy generating elements. In the liquid ejection unit of the piezoelectric method, flow passages are divided into individual flow passages equal in number to that of the ejection ports that eject droplets, and the piezoelectric element that generates pressure for ejection is attached to each of the individual flow passages. In a case where the ejection ports are to be arranged at high density without changes in the dimensions and the like of the print element board, the number of piezoelectric elements needs to be increased, and the number of electrode pads also increases with the increase of piezoelectric elements. In a case where the number of electrode pads increases, the number of wires increases, and reaction force due to elastic deformation of the wires also increases with the increase of wires. According to the present disclosure, it is possible to achieve high reliability in an electric connection portion between the print element board and the electric wiring board, even in a case where there are many electrode pads.

First Embodiment

Figure 1:
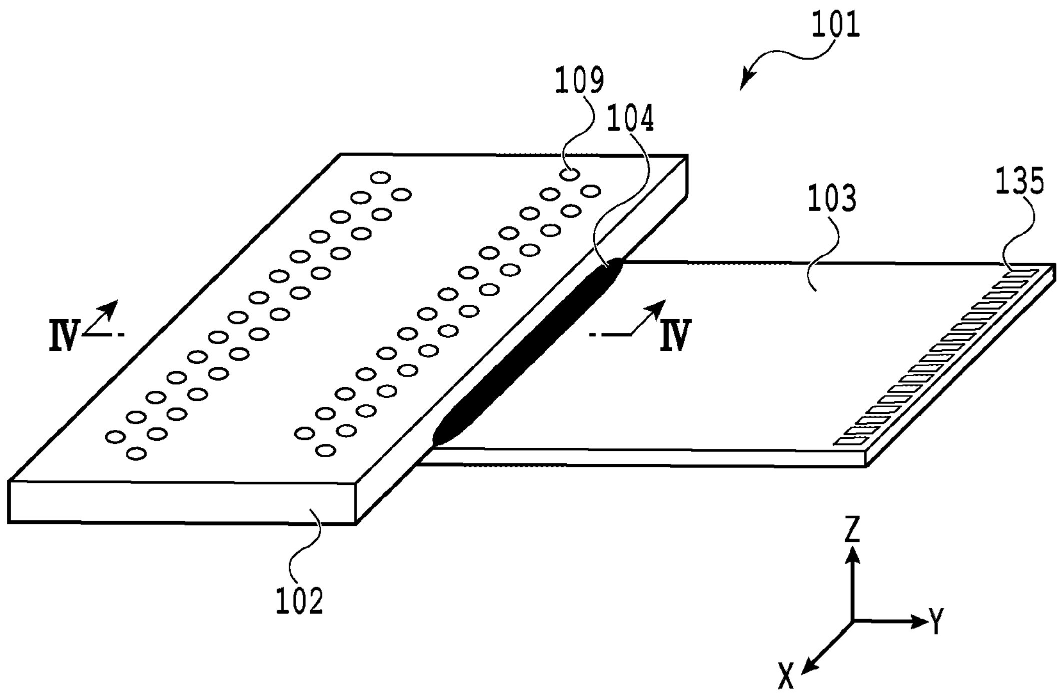
FIG. 1 is a perspective diagram illustrating an entire liquid ejection unit according to a first embodiment of the present disclosure.
Figure 2:
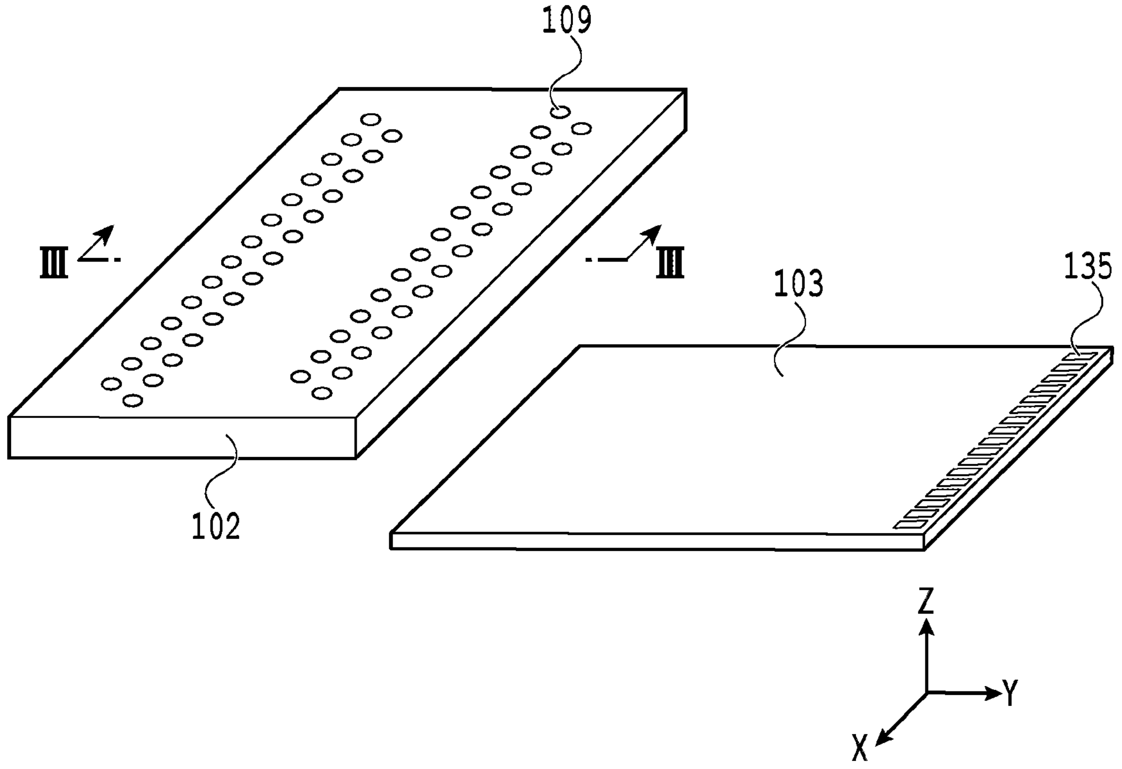
FIG. 2 is an exploded perspective diagram illustrating the entire liquid ejection unit according to the first embodiment of the present disclosure.
Figure 3:
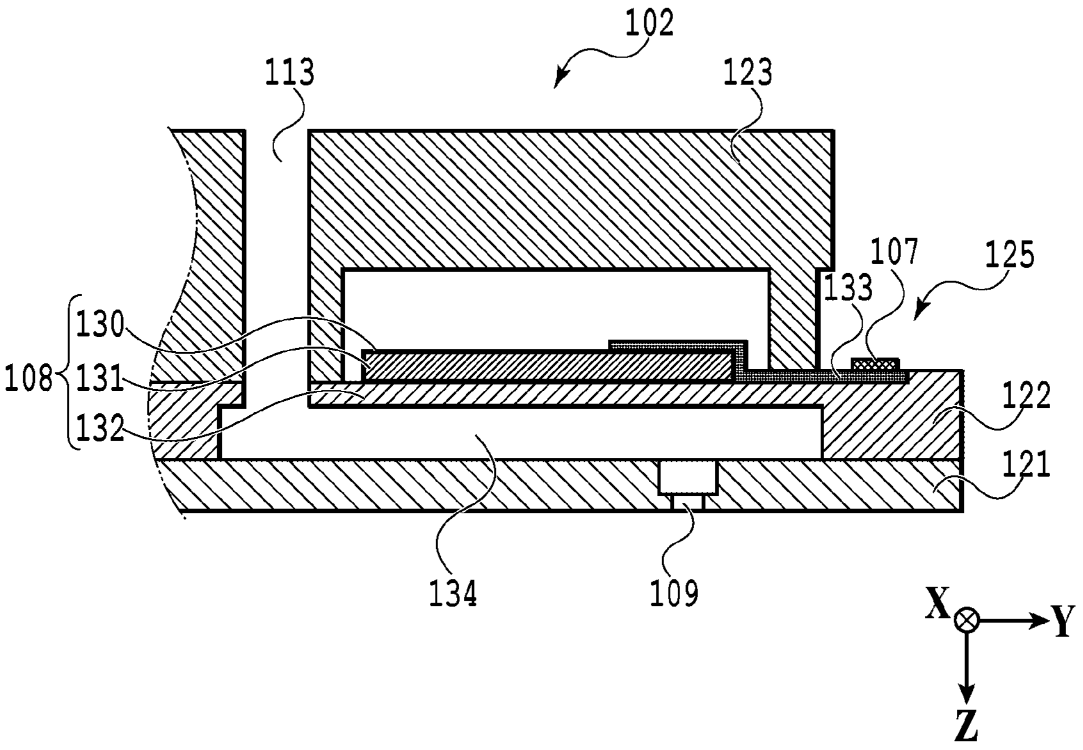
FIG. 3 is a partial cross-sectional diagram illustrating a main portion of a print element board included in the liquid ejection unit according to the first embodiment of the present disclosure.
Figure 4:
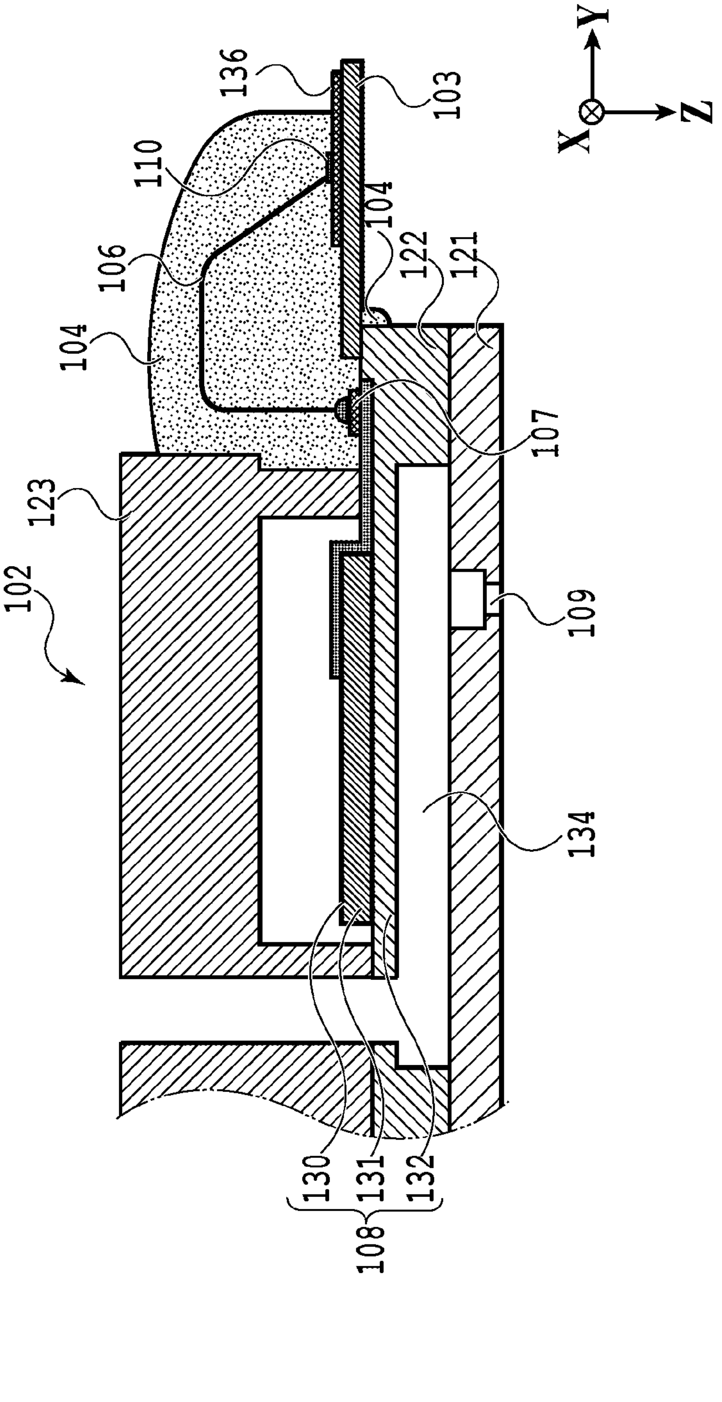
FIG. 4 is a partial cross-sectional diagram illustrating a portion of the print element board, a portion of an electric wiring board connected to the print element board, and a sealing agent which are included in the liquid ejection unit according to the first embodiment of the present disclosure.
Figure 5:
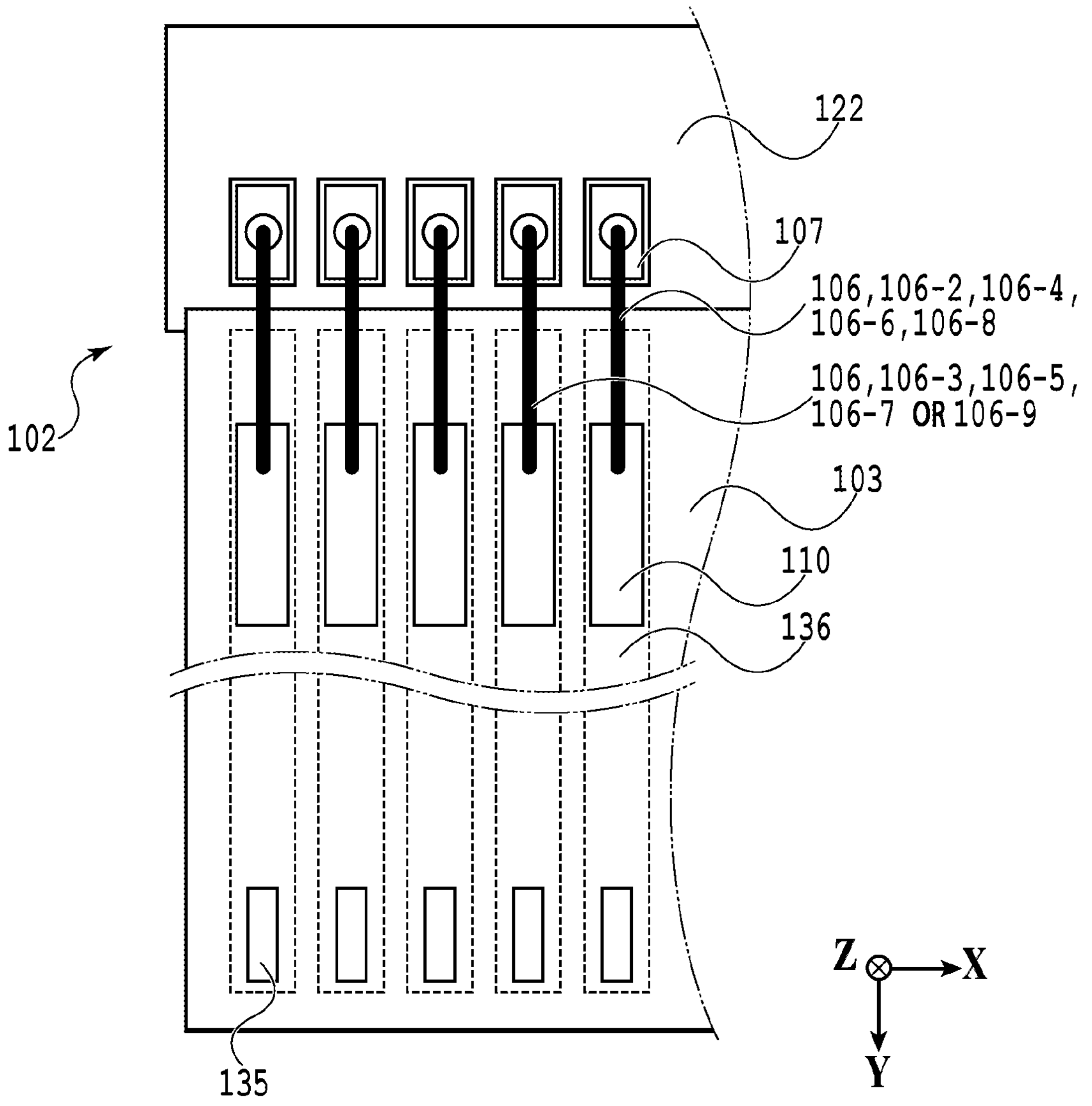
FIG. 5 is a partial plan diagram illustrating an electric connection portion and its surroundings in the liquid ejection unit according to the first embodiment to a fifth embodiment of the present disclosure.

FIGS. 1 to 5 are diagrams illustrating a liquid ejection unit of a first embodiment of the present disclosure. FIG. 1 is a perspective diagram illustrating the entire liquid ejection unit 101. FIG. 2 is an exploded perspective diagram illustrating the liquid ejection unit 101 in a state where a print element board 102 and an electric wiring board 103 are separated from each other. FIG. 3 is a partial cross-sectional diagram that is taken along the line III-III in FIG. 2 and that illustrates a main portion of the print element board 102. FIG. 4 is a partial cross-sectional diagram that is taken along the line IV-IV in FIG. 1 and that illustrates a main portion of the liquid ejection unit 101 in a state where the electric wiring board 103 is connected to the print element board 102. FIG. 5 is a partial plan diagram illustrating an electric connection portion of the print element board 102 and the electric wiring board 103 and its surroundings Note that no sealing agent 104 is illustrated in FIG. 5 to facilitate understanding of the description.

As illustrated in FIG. 1, the liquid ejection unit 101 includes the print element board 102 and the electric wiring board 103 connected to the print element board 102. Multiple ejection ports 109 that eject the liquid are arranged on one surface (upper surface in FIG. 1) of the print element board 102. As illustrated in FIG. 2, the electric wiring board 103 is an elongated member that is thin and flexible and that is made of, for example, a FPC, a TBA, or the like, and is used to supply electric power and signals from a main body of a liquid ejection apparatus in which the liquid ejection unit is mounted to the print element board 102. Terminals 110 are formed on a longitudinal end portion of the electric wiring board 103 that is on the side of the print element board 102. A conductor is exposed in a pad shape in each terminal 110. As described later, the terminals 110 are connected to electrode pads 107 of the print element board 102 via wires that are electric connection members 106. Multiple connection terminals 135 are formed on another longitudinal end portion of the electric wiring board 103, and are electrically connected to a circuit of the liquid ejection apparatus. A conductor is exposed in a pad shape also in each connection terminal 135.

The electric wiring board 103 may be bonded and fixed to an open portion surface 125 (see FIG. 3) of the print element board 102 including the electrode pads 107 by using, for example, an adhesive agent. However, use of the adhesive agent increases a material cost. Moreover, equipment for applying and curing the adhesive agent needs to be introduced, and a cost related to this is generated. Furthermore, this increases the number of steps, and increases in a variable cost and a processing cost also occur. Accordingly, in the present embodiment, bonding and fixing of the electric wiring board 103 to the open portion surface 125, including the electrode pads 107, of the print element board 102 by using the adhesive agent are avoided. In the present embodiment, the electric wiring board 103 is fixed to the open portion surface 125, including the electrode pads 107, of the print element board 102 by using the sealing agent 104 also having a function of protecting the electric connection portion. In this case, a certain amount of the sealing agent 104 also flows to a portion, where the electric wiring board 103 is placed, of the print element board 102, and is cured. Accordingly, in the present embodiment, the sealing agent 104 has both of the function of protecting the electric connection portion and the function of fixing the electric wiring board 103 to the open portion surface 125, including the electrode pads 107, of the print element board 102.

As illustrated in FIG. 5, the multiple terminals 110 and the multiple connection terminals 135 are electrically connected to one another on a one-to-one basis by multiple lead portions 136 formed in a conductive layer inside the electric wiring board 103.

As illustrated in FIG. 3, the print element board 102 mainly includes an ejection port formation board 121 in which the ejection ports 109 are formed, an actuator board 122 including energy generating elements 108 and electrodes 133, and a flow passage formation board 123. These boards 121, 122, and 123 are stacked one on top of another.

A flow passage 113 is formed in the flow passage formation board 123, and communicates with individual flow passages 134 formed in the actuator board 122. The actuator board 122 has an open portion surface 125 on the upper side, that is the side of flow passage formation board 123, and this open portion surface 125 includes the electrode pads 107. The actuator board 122 further includes the energy generating elements 108 each including an upper electrode film 130, a piezoelectric layer 131, and a lower electrode film 132. The volume of each energy generating element 108 is changed by a signal inputted from the outside via the electrode 133 and the electrode pad 107, and the liquid is thereby ejected from the ejection port 109.

Next, connection between the print element board 102 and the electric wiring board 103 is described with reference to FIG. 4. The print element board 102 and the electric wiring board 103 are electrically connected to each other by connecting the electrode pads 107 of the print element board 102 and the terminals 110 of the electric wiring board 103 to one another by using the electric connection members 106. As described above, a portion including the electrode pads 107, the terminals 110, and the electric connection members 106 is referred to as an electric connection portion. The electric connection members 106 are normally conductive wires for connection (that is, bonding wires), and are joined to the respective electrode pads 107 and the respective terminals 110 by a wire bonding method. The electric connection members 106 are not limited to gold wires, and may be, for example, members that contain one of metals of gold, copper, aluminum, and silver or an alloy containing two or more of these metals as a main component. In the present embodiment, the electric connection members 106 are, for example, gold wires. The entire electric connection portion is sealed and protected by the sealing agent 104. As illustrated in FIGS. 4 and 5, the sealing agent 104 spreads over a range from a position close to the terminals 110 of the lead portions 136 to a side surface of the flow passage formation board 123, in the longitudinal direction of the electric wiring board 103. Moreover, the sealing agent 104 spreads over such a range that the sealing agent 104 completely covers the electric connection members 106 in a height direction of the print element board 102 or a height direction of the electric wiring board 103 (that is, thickness direction). The sealing agent 104 preferably has stiffness capable of protecting the electric connection portion from external force and a function of suppressing corrosion of the electric connection portion caused by the liquid for ejection and moisture in an environment. Accordingly, a material such as epoxy resin is preferably used in the sealing agent 104. However, an appropriate material depending on a required performance of the sealing agent 104 may be used in the sealing agent 104.

Although the description will be repeated, in the present embodiment, the electrode pads 107 and the terminals 110 are connected to one another by the wire bonding using the electric connection members 106. In execution of the wire bonding, a bonding tool (not illustrated) is used to apply heat, pressure, ultrasonic wave, or the like to the electric connection members 106 while causing the electric connection members 106 to abut the electrode pads 107 and the terminals 110. As a result, one end of each of the electric connection members 106 is joined to a corresponding one of the electrode pads 107, and first bonding points are thereby provided. Moreover, the other ends are joined to the terminals 110, and second bonding points are thereby provided. The electrical connection between the electrode pads 107 and the terminals 110 are thus completed. Generally, a wire bonder is used for the wire bonding, and a wire shape is shaped by adjusting a trajectory of the bonding tool, referred to as a capillary, in various ways.

Figure 6:
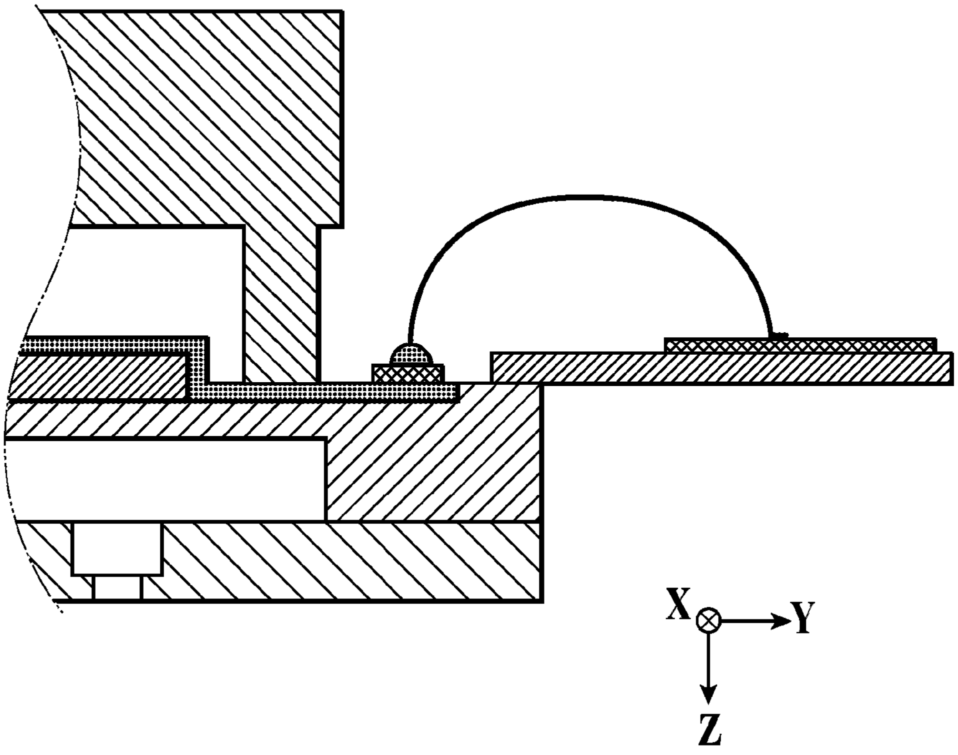
FIG. 6 is a partial cross-sectional diagram illustrating an electric connection portion before sealing by a sealing agent in a liquid ejection unit according to a comparative example.
Figure 7:
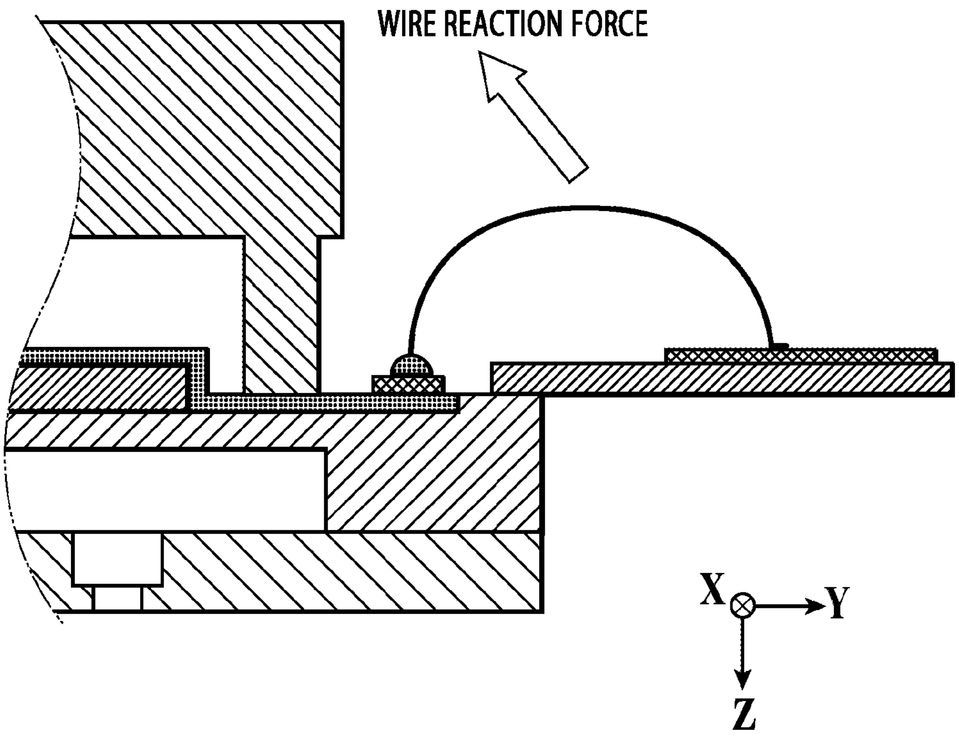
FIG. 7 is a partial cross-sectional diagram for explaining reaction force generated in a wire that is an electric connection member in the comparative example.
Figure 8:
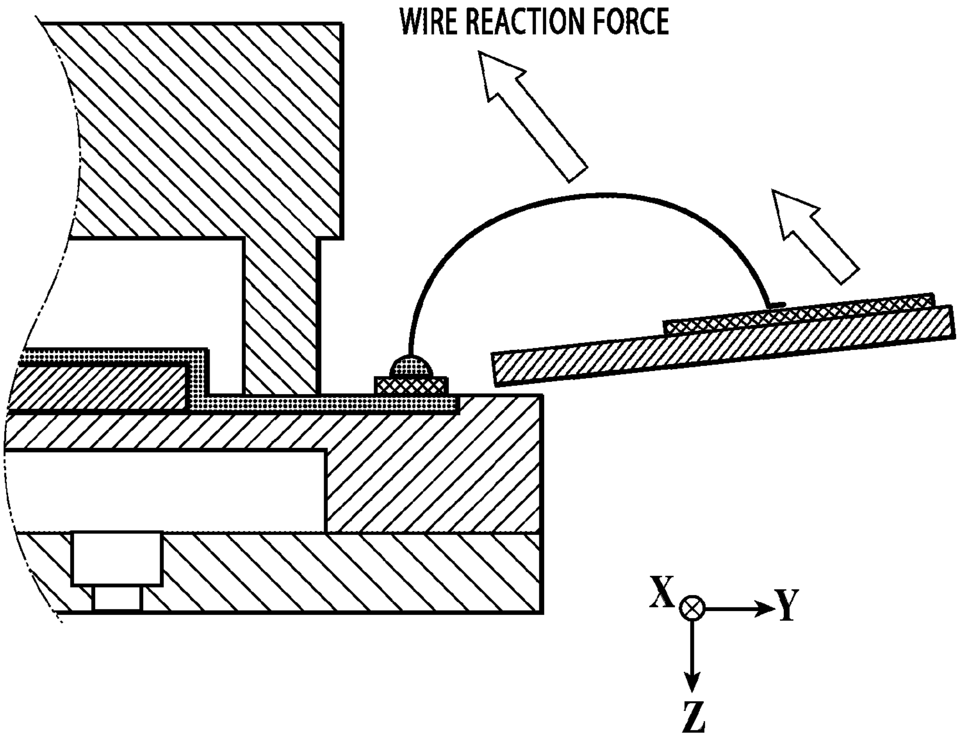
FIG. 8 is a partial cross-sectional diagram for explaining displacement of an electric wiring board due to the reaction force generated in the wire that is the electric connection member in the comparative example.
Figure 9:
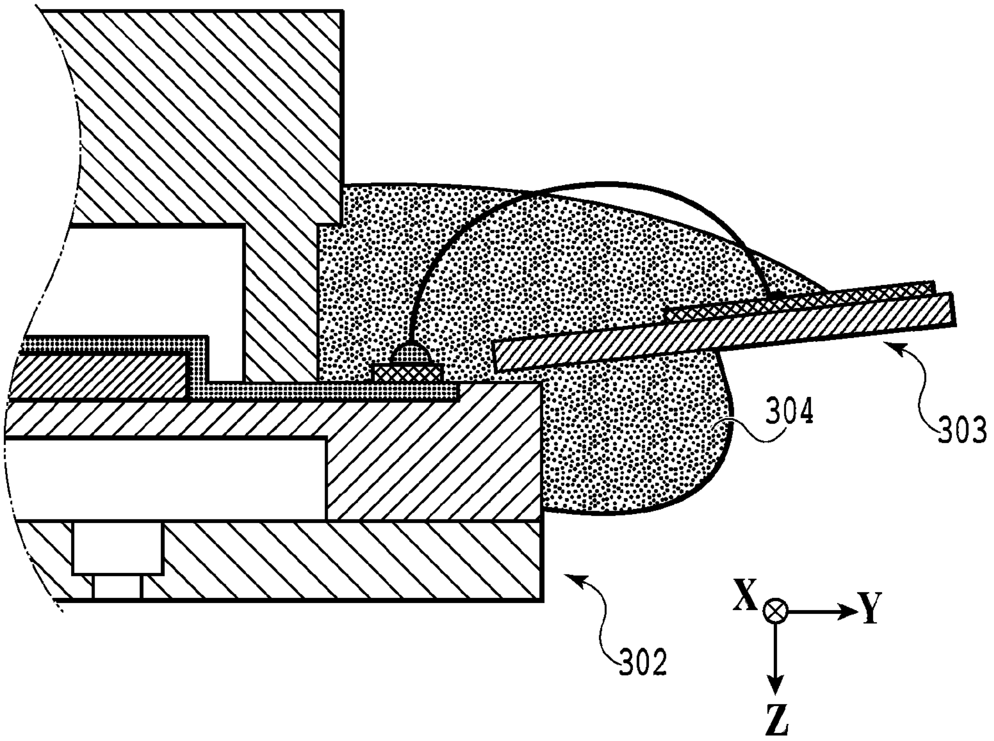
FIG. 9 is a partial cross-sectional diagram for explaining that protection of the electric connection portion by the sealing agent is insufficient due to displacement of the electric wiring board in the comparative example.

FIG. 6 illustrates a general wire shape independent of the present embodiment, as a comparative example. In this case, a wire has a shape with no clear bending portion. In such a shape, after the electrical connection, the wire is bent in an elastic deformation region over an entire length of the wire with the first bonding point as a fulcrum, and reaction force as illustrated in FIG. 7 is generated in the wire. As a result, force that lifts an electric wiring board 303 as in FIG. 8 acts on the electric wiring board 303, and there occurs a case where a gap is formed between a print element board 302 and the electric wiring board 303. If a sealing agent 304 is applied in a state where such a gap is formed, as illustrated in FIG. 9, the sealing agent 304 flows from the gap between the print element board 302 and the electric wiring board 303, out to a region below the electric wiring board 303. In this case, there is a possibility that appropriate wire covering with the sealing agent 304 cannot be performed, and there is a concern about securing of electrical reliability. In a case where the height of the loop shape of the wire is low, in a case where the wire length is small, or in a case where the wire has a tensioned shape, the possibility that the electric wiring board 303 is lifted increases, and the possibility that the sealing agent 304 cannot perform appropriate wire covering increases.

Figure 10:
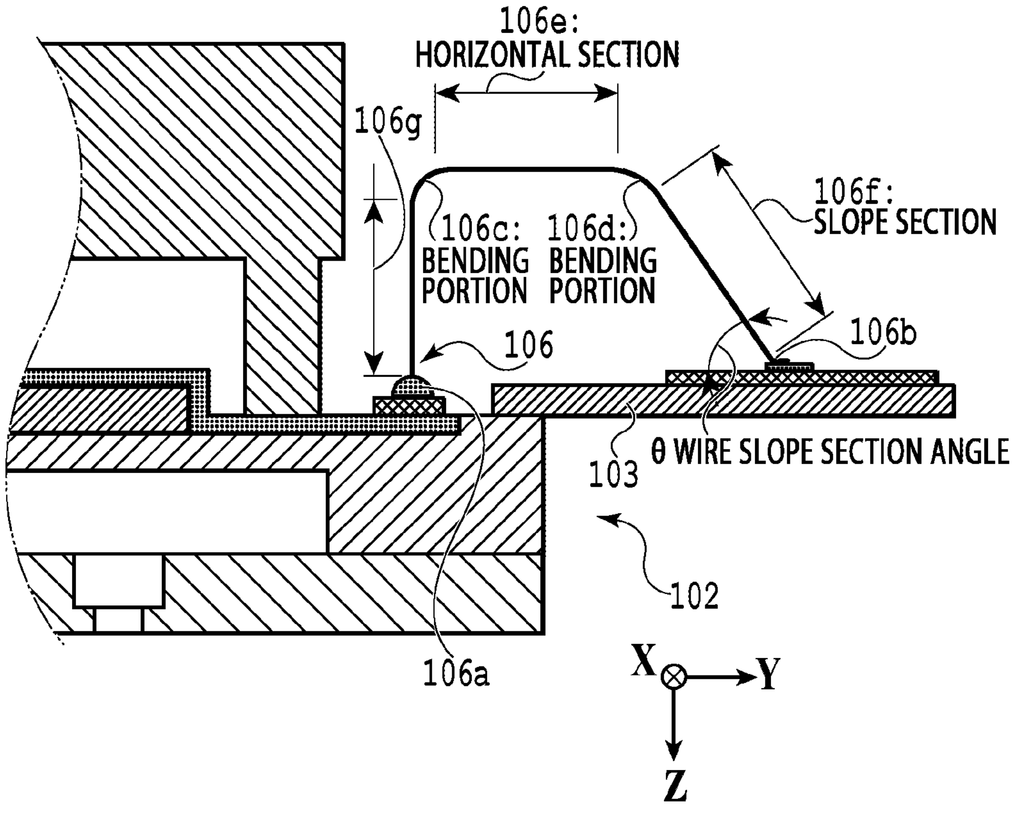
FIG. 10 is a partial cross-sectional diagram illustrating the electric connection portion before being sealed by the sealing agent and surroundings of the electric connection portion in the liquid ejection unit according to the first embodiment of the present disclosure.

Meanwhile, in the present embodiment, as illustrated in FIG. 10, a first bending portion **106*c* and a second bending portion 106*d* are provided in a loop shape of each electric connection member 106 extending from a first bonding portion 106*a* to a second bonding portion 106*b*. Moreover, a perpendicular section 106*g* is provided between the first bonding portion 106*a* and the first bending portion 106*c*. A horizontal section 106*e* is provided between the first bending portion 106*c* and the second bending portion 106*d*. A slope section 106*f* is provided in a section from the second bending portion 106*d* to the second bonding portion 106*b*. The perpendicular section 106*g* is perpendicular to the open portion surface 125. The horizontal section is substantially parallel to the open portion surface 125, and is also substantially parallel to the surface of the electric wiring board 103 on which the terminals 110 are arranged. The first bending portion 106*c* and the second bending portion 106*d* are plastically deformed near a yield point. Specifically, the first bending portion 106*c* and the second bending portion 106*d* are each bent at such a curvature that the magnitude of strain falls within a range from an upper yield point to a yield shelf in a relationship between strain and internal stress of the electric connection member 106. In such a case, the electric connection member 106 is plastically deformed, and maintains a shape as illustrated in FIG. 10** without being restricted by external force.

Figure 11:
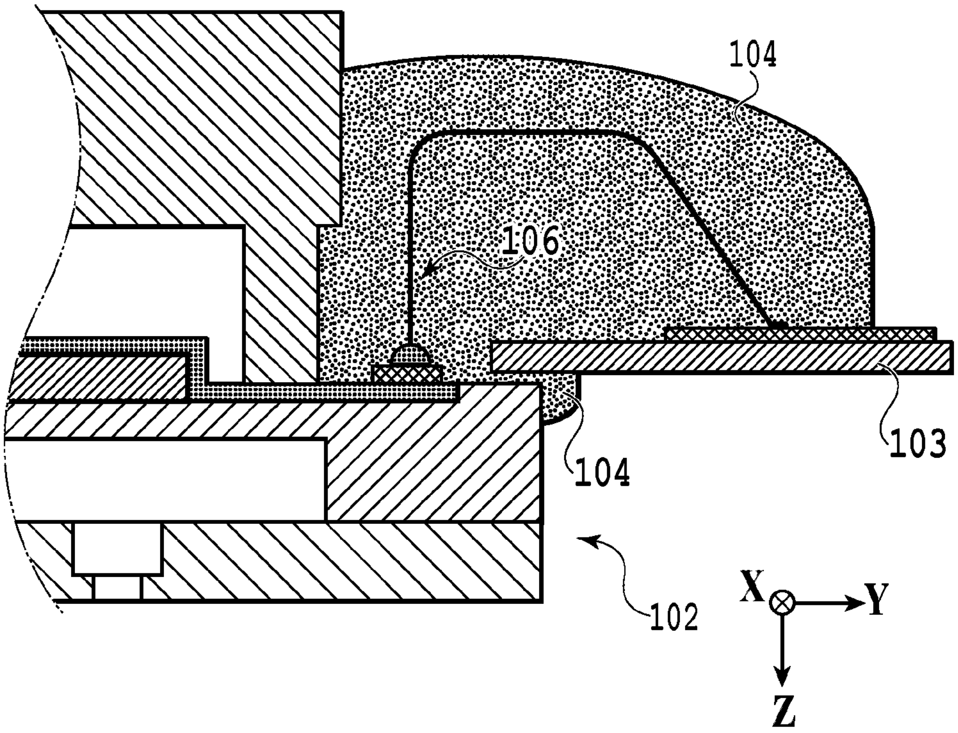
FIG. 11 is a partial cross-sectional diagram illustrating the electric connection portion sealed by the sealing agent and the surroundings of the electric connection portion in the liquid ejection unit according to the first embodiment of the present disclosure.

There is a possibility that the second bending portion 106*d* does not plastically deform. However, even in such a case, the elastic deformation region is the slope section 106*f* extending from the second bending portion 106*d* to the second bending portion 106*d*. Thus, the reaction force applied to the electric wiring board 103 is reduced, and the force lifting the electric wiring board 103 is reduced. Accordingly, as illustrated in FIG. 11, a gap formed between the print element board 102 and the electric wiring board 103 can be reduced. In a case where the second bending portion 106*d* is plastically deformed, as illustrated in FIG. 4, almost no gap is formed between the print element board 102 and the electric wiring board 103, and leakage of the sealing agent 104 on the back surface of the electric wiring board 103 is only slight. Since the force acting in such a way as to lift the electric wiring board 103 is small even in a case where the second bending portion 106*d* does not elastically deform, as illustrated in FIG. 11, only a slight gap is formed between the print element board 102 and the electric wiring board 103. Accordingly, the leakage of the sealing agent 104 on the back surface of the electric wiring board 103 is only slight. Thus, it is possible to avoid a case where the electric connection member 106 is partially exposed from the sealing agent 104.

In this case, the length of the horizontal section is desirably between 50 μm and 500 μm. Moreover, an angle (wire slope section angle) θ of the slope section 106*f* at the second bonding portion 106*b* with respect to the surface of the electric wiring board 103 on which the terminals 110 are arranged is desirably between 10 degrees and 90 degrees. In a case where the bonding at the second bonding portion 106*b* is performed at an angle larger than the aforementioned angle, a capillary trajectory in loop formation becomes complex, and the shape becomes unstable. Moreover, a joining property of the second bonding portion 106*b* becomes unstable. Note that the perpendicular section 106*g* of the electric connection member 106 does not have to be perpendicular to the open portion surface 125, and may be tilted such that, for example, the first bonding portion 106*a*, the first bending portion 106*c*, the second bending portion 106*d*, and the second bonding portion 106*b* form a trapezoid shape. However, it is preferable that a distance between the first bending portion 106*c* and the first bonding portion 106*a* of the electric connection member 106 is shorter than a distance between the second bending portion 106*d* and the second bonding portion 106*b* in a projection onto a plane orthogonal to the ejection direction of the liquid.

Figure 12:
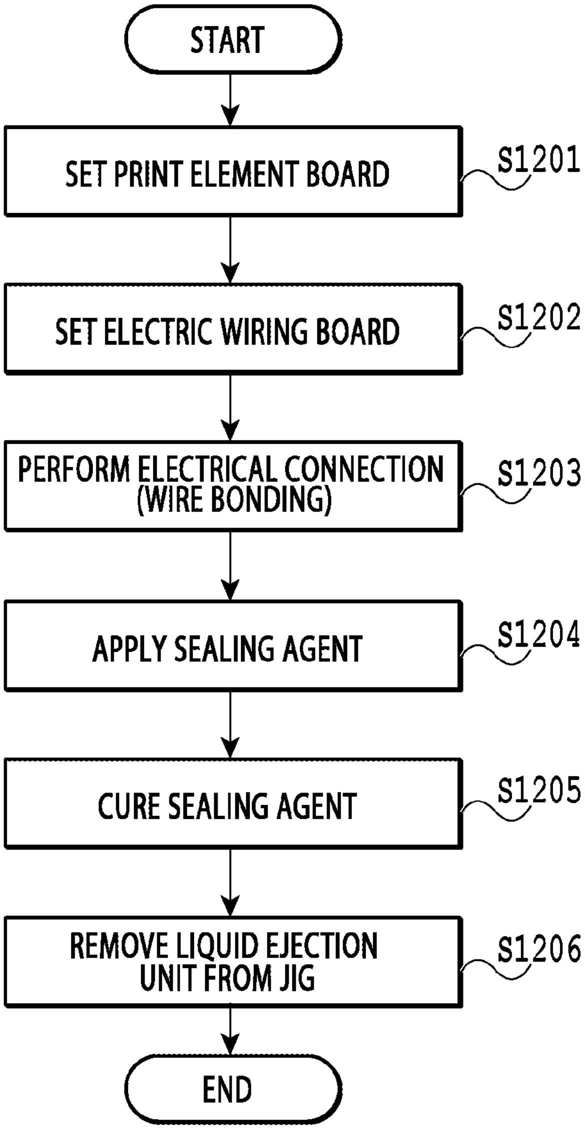
FIG. 12 is a flow chart for explaining a manufacturing method of the liquid ejection unit according to the embodiments of the present disclosure.

Next, a procedure of connecting the electric wiring board 103 to the print element board 102 is described with reference to FIG. 12.

In step S1201, the print element board 102 is placed on a flat surface such as, for example, a jig (not illustrated). Note that "step S" is abbreviated as "S" hereinafter.

Next, in S1202, the end portion of the electric wiring board 103 in the longitudinal direction thereof that is closer to the terminals 110 is arranged on the open portion surface 125 of the print element board 102. In this case, the electric wiring board 103 is arranged not to cover the electrode pads 107 on the open portion surface 125. Moreover, the electric wiring board 103 is arranged such that the terminals 110 are separated from the electrode pads 107 by a predetermined distance.

In this case, as described above, bonding and fixing of the electric wiring board 103 to the print element board 102 is avoided. Instead, the electric wiring board 103 is arranged by using the jig (not illustrated) so that the same positional relationship is achieved as that in a case where the electric wiring board 103 is bonded and fixed to the print element board 102.

Next, in S1203, the electrode pads 107 of the print element board 102 and the terminals 110 of the electric wiring board 103 are electrically connected to one another by the electric connection members 106. In this case, as described above, the electric connection members 106 are shaped into a shape as illustrated in FIG. 10 by using a capillary.

Next, in S1204, the sealing agent 104 is applied to the electric connection portion including the electrode pads 107, the electric connection members 106, and the terminals 110 to cover the electric connection portion with the sealing agent 104.

Then, in S1205, the sealing agent 104 is cured. The electric wiring board 103 is thereby fixed to the print element board 102, and the electric connection portion is sealed by the sealing agent 104.

Lastly, in S1206, the finished liquid ejection unit 101 is removed from the jig.

Second Embodiment

Figure 13:
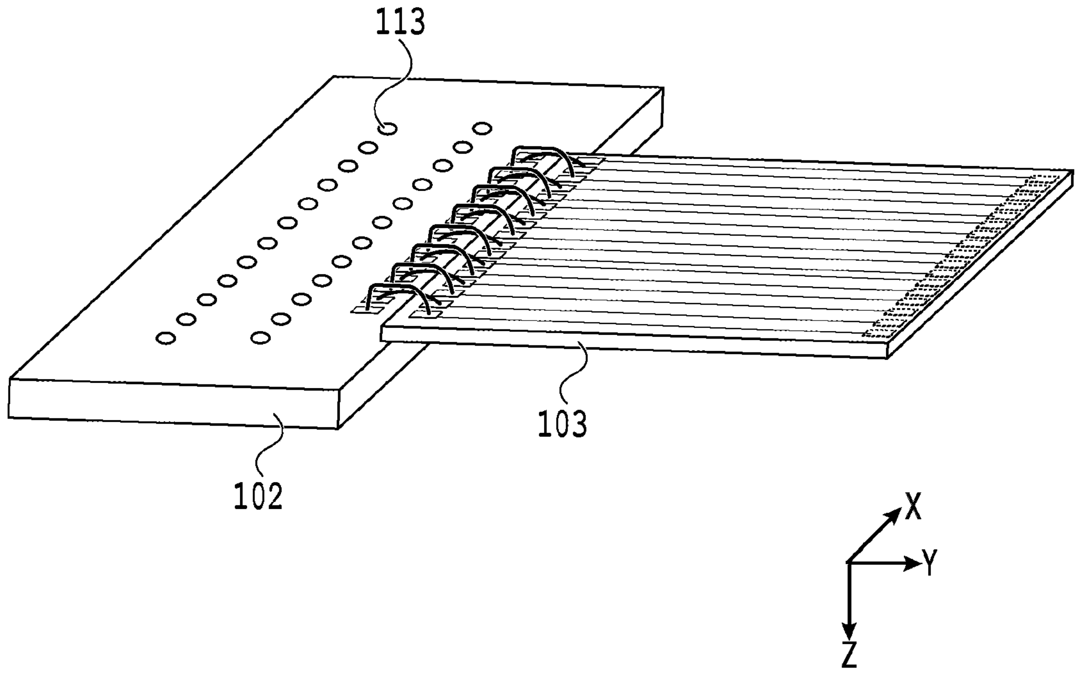
FIG. 13 is a perspective diagram illustrating an entire liquid ejection unit according to a second embodiment of the present disclosure.
Figure 14:
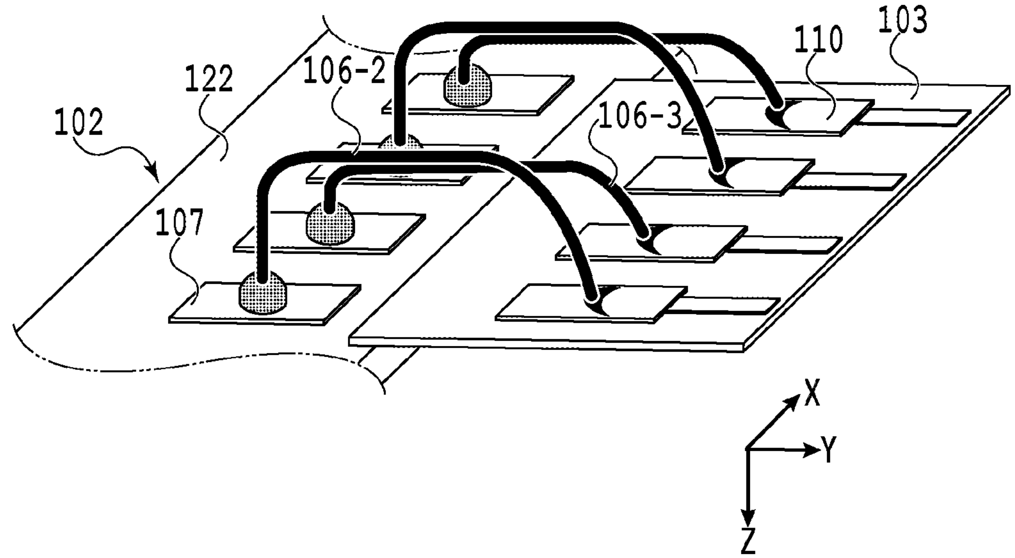
FIG. 14 is a partial perspective diagram illustrating an electric connection portion and its surroundings in the liquid ejection unit according to the second embodiment of the present disclosure.

FIGS. 13 and 14 illustrate a state where the sealing agent 104 in the liquid ejection unit 101 of a second embodiment is omitted. Particularly, FIG. 13 is a schematic perspective diagram of the liquid ejection unit 101 in a state where the electric wiring board 103 is connected to the print element board 102, and FIG. 14 is an enlarged perspective diagram of the electric connection portion. In these drawings, components similar to those in the first embodiment are denoted by the same reference numerals, and overlapping description of these components is not repeated below.

As in the first embodiment, also in the present embodiment, the electric connection portion subjected to the wire bonding is sealed with the sealing agent 104 to protect the electric connection portion from external force and to suppress corrosion of the electric connection portion caused by the liquid for ejection and moisture in an environment. Generally, a material such as an epoxy resin is preferably used as the sealing agent 104, and, for example, a spherical filler is added to the sealing agent 104 to suppress a coefficient of linear expansion of the sealing agent 104. In the present embodiment, such a material that 95% by mass of the filler has an outer diameter of 65 μm or less is used as the filler. In a case where the sealing is performed by using the sealing agent 104 in a situation where the pitch of the electrode pads is small, there is a possibility that part of the filler in the sealing agent 104 cannot pass through a gap between each two adjacent electric connection members 106 and cannot reach an area under the electric connection members 106 due to the small pitch of the electric connection members 106. For example, in a case where the pitch of the electrode pads is 70 μm and the wire diameter is 5 μm, there is a possibility that about 5% of the filler cannot pass through the gap. In a case where the wire diameter is 15 μm, the proportion of the filler that cannot pass through the gap between the wires further increases. In this case, since the density of the filler is insufficient under the electric connection members 106, the sealing agent 104 may not be able to exhibit its original performance. Moreover, since a distribution of the coefficient of linear expansion of the filler is formed, a side effect may occur. Accordingly, in the present embodiment, as illustrated in FIG. 14, for example, electric connection members 106-2 with a first height and electric connection members 106-3 with a second height are alternately arranged. Providing a height difference between the electric connection members 106-2 and the electric connection members 106-3 that are alternately arranged adjacent to one another can increase the width of the gaps between the electric connection members 106-2 and the electric connection members 106-3. Accordingly, the filler that reaches the area under the electric connection members 106-2 and 106-3 can be increased. Moreover, the density of the filler under the electric connection members 106-2 and 106-3 can be increased to the density of the filler above the electric connection members 106-2 and 106-3. Accordingly, the sealing agent 104 can exhibit its original performance, and can stably protect the electric connection portion.

Note that, also in the present embodiment, the first bending portion 106*c* and the second bending portion 106*d* as illustrated in FIG. 10 are provided in each of the electric connection members 106-2 and the electric connection members 106-3.

Moreover, the height of the loop formed by each of the electric connection members 106-2 and 106-3 can be set to any height in relationship to the sealing agent 104 to be used and to other parts.

Third Embodiment

The present embodiment is basically the same as the second embodiment.

Figure 15:
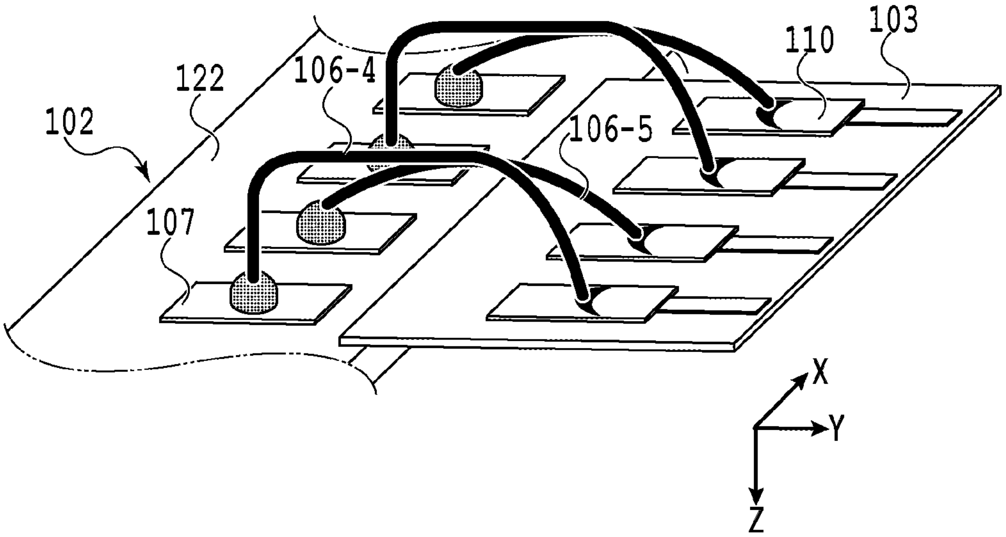
FIG. 15 is a partial perspective diagram illustrating an electric connection portion and its surroundings in a liquid ejection unit according to a third embodiment of the present disclosure.

As illustrated in FIG. 15, in the present embodiment, electric connection members 106-4 and electric connection members 106-5 are used. The electric connection members 106-4 and the electric connection members 106-5 are alternately arranged, and a height difference is provided between the electric connection members 106-4 and the electric connection members 106-5 such that the electric connection members 106-4 are higher than the electric connection members 106-5. The electric connection members 106-4 are each provided with the first bending portion 106*c* and the second bending portion 106*d* as illustrated in FIG. 10, but the electric connection members 106-5 are provided with no bending portion.

According to the present embodiment, since the electric connection members 106-4 are each provided with the first bending portion 106*c* and the second bending portion 106*d*, the force lifting the electric wiring board 103 generated by all electric connection members can be halved. Accordingly, no gap is formed between the print element board 102 and the electric wiring board 103 or, even if a gap is formed, the gap is small. Thus, the sealing agent 104 can fix the electric wiring board 103 to the print element board 102, and can also protect the electric connection portion as in the first embodiment.

Moreover, according to the present embodiment, since the height difference is provided between each adjacent two of the electric connection members 106-4 and the electric connection members 106-5 as in the second embodiment, effects similar to those in the second embodiment are exhibited regarding the filler.

Fourth Embodiment

The present embodiment is basically the same as the second embodiment.

Figure 16:
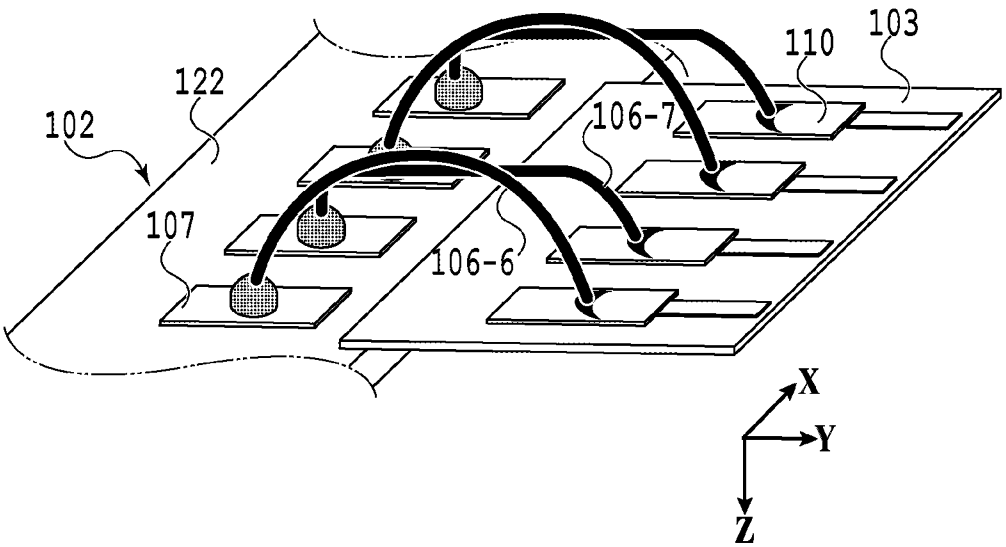
FIG. 16 is a partial perspective diagram illustrating an electric connection portion and its surroundings in a liquid ejection unit according to a fourth embodiment of the present disclosure.

As illustrated in FIG. 16, in the present embodiment, electric connection members 106-6 and electric connection members 106-7 are used. The electric connection members 106-6 and the electric connection members 106-7 are alternately arranged, and a height difference is provided between the electric connection members 106-6 and the electric connection members 106-7 such that the electric connection members 106-6 are higher than the electric connection members 106-7. The electric connection members 106-7 are each provided with the first bending portion 106*c* and the second bending portion 106*d* as illustrated in FIG. 10, but the electric connection members 106-6 are provided with no bending portion.

According to the present embodiment, since the electric connection members 106-7 are each provided with the first bending portion 106*c* and the second bending portion 106*d*, the force lifting the electric wiring board 103 generated by all electric connection members can be halved. Particularly, since the reaction force generated by the electric connection members 106-6 of the present embodiment is smaller than the reaction force generated by the electric connection members 106-5 of the third embodiment, the force lifting the electric wiring board 103 generated by all electric connection members can be reduced from that in the third embodiment. Accordingly, no gap is formed between the print element board 102 and the electric wiring board 103 or, even if a gap is formed, the gap is small. Thus, the sealing agent 104 can fix the electric wiring board 103 to the print element board 102, and can also protect the electric connection portion as in the first embodiment.

Moreover, according to the present embodiment, since the height difference is provided between each adjacent two of the electric connection members 106-6 and the electric connection members 106-7 as in the second embodiment, effects similar to those in the second embodiment are exhibited regarding the filler.

Fifth Embodiment

The present embodiment is basically the same as the second embodiment.

Figure 17:
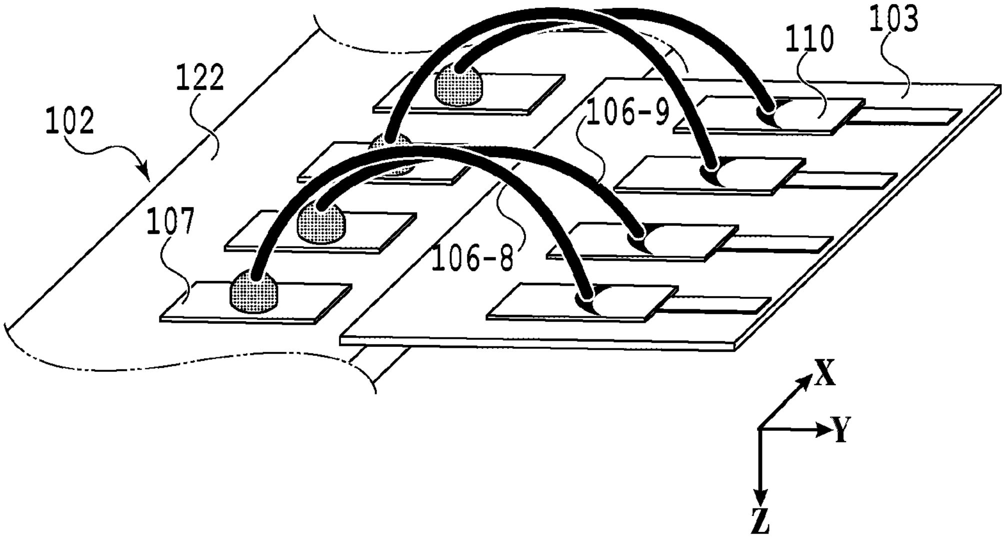
FIG. 17 is a partial perspective diagram illustrating an electric connection portion and its surroundings in a liquid ejection unit according to a fifth embodiment of the present disclosure.

As illustrated in FIG. 17, in the present embodiment, electric connection members 106-8 and electric connection members 106-9 are used. The electric connection members 106-8 and the electric connection members 106-9 are alternately arranged, and a height difference is provided between the electric connection members 106-8 and the electric connection members 106-9 such that the electric connection members 106-8 are higher than the electric connection members 106-9. The electric connection members 106-8 and the electric connection members 106-9 are provided with no bending portion.

According to the present embodiment, although the electric connection members 106-8 and the electric connection members 106-9 are provided with no bending portion, the reaction force generated by the electric connection members 106-8 is smaller than the reaction force generated by the electric connection members 106-9. Accordingly, the force lifting the electric wiring board 103 generated by all electric connection members can be reduced from that in a case where the height of the electric connection members 106-8 is aligned with the height of the electric connection members 106-9. Hence, no gap is formed between the print element board 102 and the electric wiring board 103 or, even if a gap is formed, the gap is small. Thus, the sealing agent 104 can fix the electric wiring board 103 to the print element board 102, and can also protect the electric connection portion as in the first embodiment.

Moreover, according to the present embodiment, since the height difference is provided between each adjacent two of the electric connection members 106-8 and the electric connection members 106-9 as in the second embodiment, effects similar to those in the second embodiment are exhibited regarding the filler.

Sixth Embodiment

Figure 18:
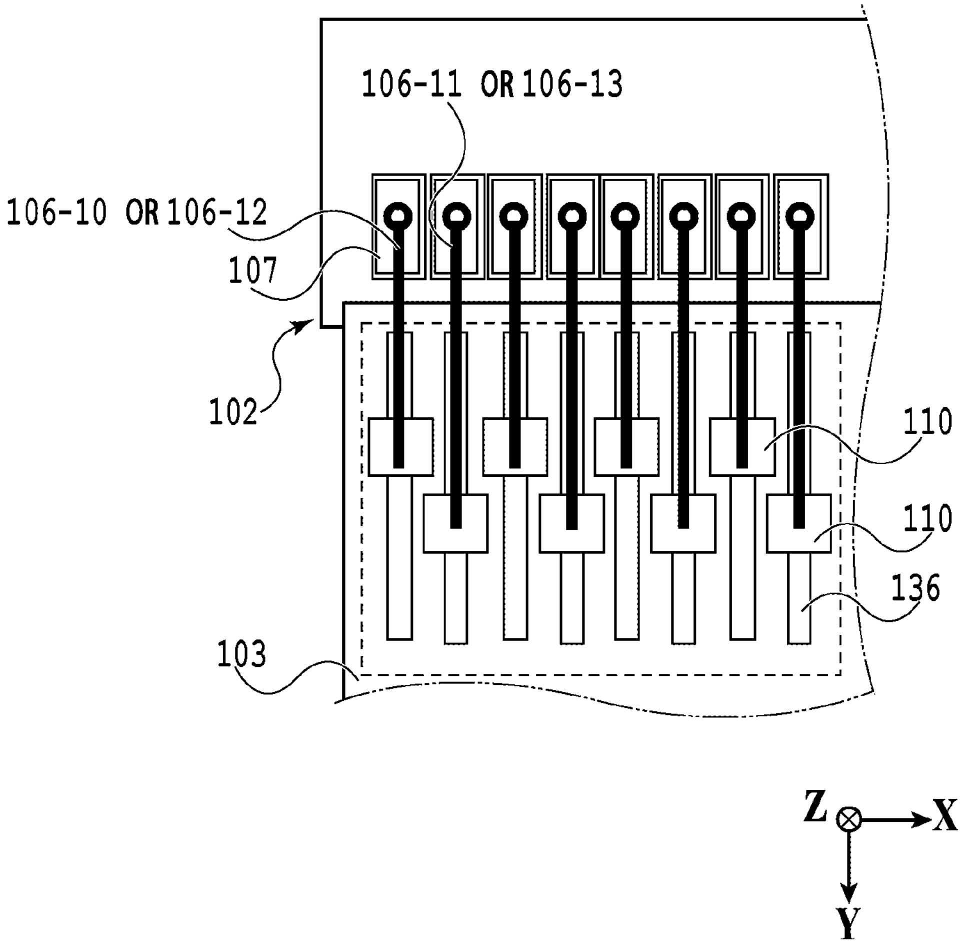
FIG. 18 is a partial plan diagram illustrating an electric connection portion and its surroundings in a liquid ejection unit according to sixth and seventh embodiments of the present disclosure.
Figure 19:
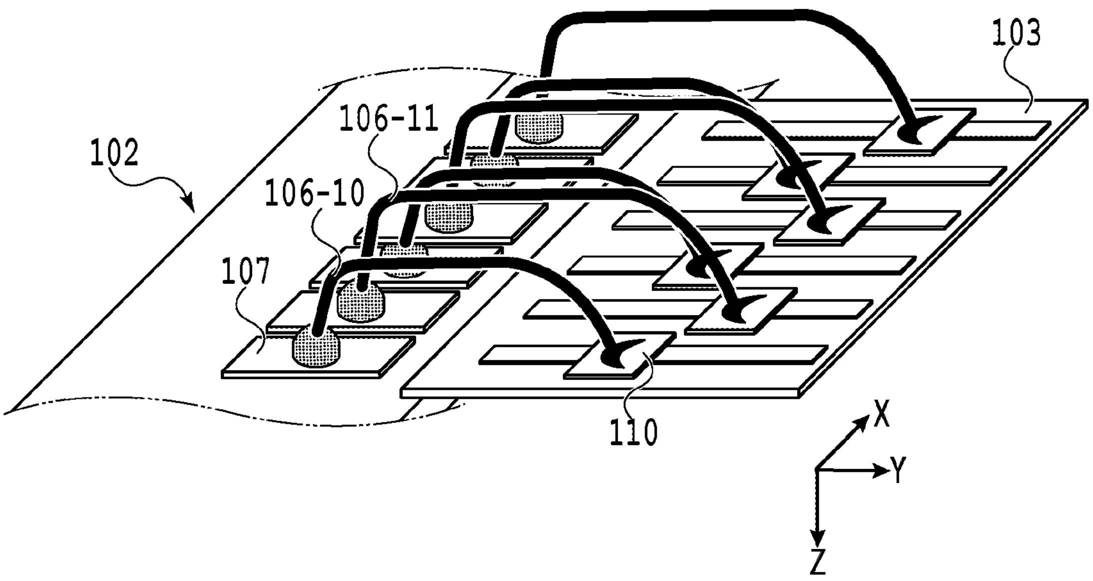
FIG. 19 is a partial perspective diagram illustrating the electric connection portion and its surroundings in the liquid ejection unit according to the sixth embodiment of the present disclosure.

FIGS. 18 and 19 illustrate a liquid ejection unit of a sixth embodiment. FIG. 18 is a schematic plan diagram in a state where the electric wiring board 103 is connected to the print element board 102, and FIG. 19 is an enlarged perspective diagram of the electric connection portion. Pitches of parts such as the electrode pads 107 and the terminals 110 become smaller and smaller with an increase in the density of the ejection ports. Particularly, reduction of a pitch in the electric wiring board 103 has tighter technical limits than those in the electrode pads 107 in the current state of the art in terms of manufacturing and functions. Moreover, the terminals 110 are arranged at positions where the second bonding is performed, and a concern about a bonding joining property grows with a decrease in the size of a region where the bonding is performed. Accordingly, in the present embodiment, the following arrangement is used to avoid the limits in terms of manufacturing and functions of the electric wiring board 103 as much as possible and to achieve pitch reduction without a decrease in the joining property of bonding portions. Specifically, as illustrated in FIG. 18, the terminals 110 that are provided in the electric wiring board 103 and that are located at the positions where the second bonding is performed are arranged to be alternately shifted in a longitudinal direction of the lead portions 136. This arrangement allows the width of the terminals 110 to be increased and allows a space around each terminal 110 to be increased as illustrated in FIG. 18. Accordingly, it is possible to reduce the pitch in the electric wiring board 103 without a decrease in the joining property of the second bonding portions.

Note that, as illustrated in FIG. 19, in the present embodiment, electric connection members 106-10 corresponding to the terminals 110 closer to the electrode pads 107 each have two bending portions, a horizontal section, and a slope section. Moreover, electric connection members 106-11 corresponding to the terminals 110 farther away from the electrode pads 107 also each have two bending portions, a horizontal section, and a slope section. This is the same as the first embodiment. Moreover, a height difference is provided between the electric connection members 106-10 and the electric connection members 106-11 such that the electric connection members 106-10 are lower than the electric connection members 106-11.

Seventh Embodiment

Figure 20:
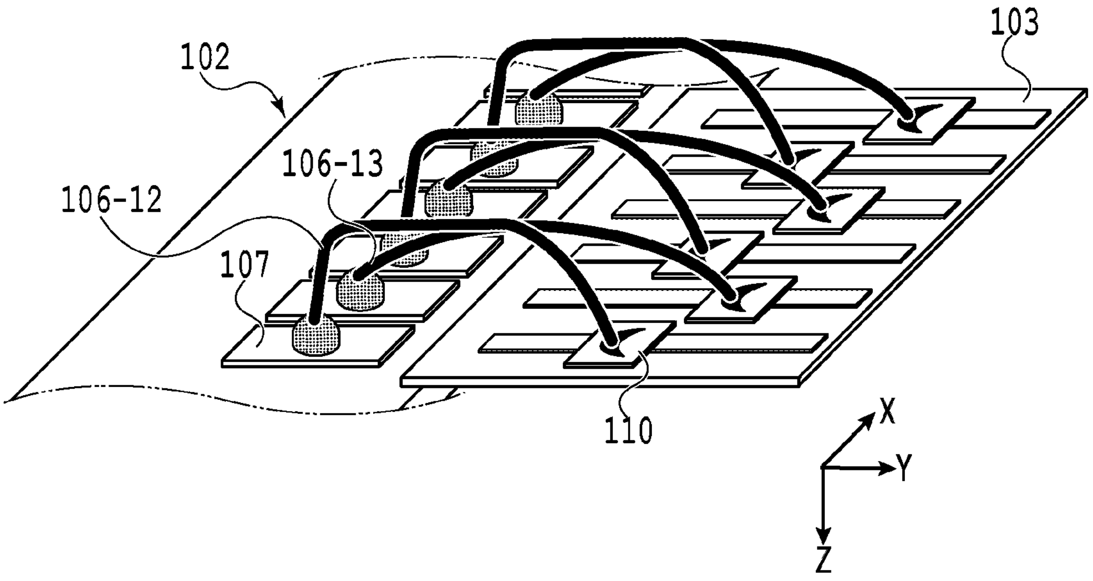
FIG. 20 is a partial perspective diagram illustrating the electric connection portion and its surroundings in the liquid ejection unit according to the seventh embodiment of the present disclosure.

FIGS. 18 and 20 illustrate a liquid ejection unit of a seventh embodiment. FIG. 18 is a schematic plan diagram in a state where the electric wiring board 103 is connected to the print element board 102, and FIG. 20 is an enlarged perspective diagram of the electric connection portion. The present embodiment has a configuration using two types of electric connection members of electric connection members 106-12 having a loop shape provided with bending portions and electric connection members 106-13 having a loop shape provided with no bending portion.

Specifically, as illustrated in FIG. 20, in the present embodiment, the electric connection members 106-12 corresponding to the terminals 110 closer to the electrode pads 107 each have two bending portions, a horizontal section, and a slope section as in the first embodiment. Meanwhile, the electric connection members 106-13 corresponding to the terminals 110 farther away from the electrode pads 107 have no bending portion. Moreover, a height difference is provided between the electric connection members 106-12 and the electric connection members 106-13 such that the electric connection members 106-12 are higher than the electric connection members 106-13. Furthermore, in the present embodiment, the width of the lead portions is increased as in the third embodiment.

Importance of providing the bending portions has been described above, and this technique has been applied to the aforementioned embodiments. Generally, in order to form the bending portions in the electric connection members 106, a so-called reforming operation needs to be additionally included in a trajectory operation of the capillary. Accordingly, in a case where the bending portions are formed in the electric connection members 106, the productivity may slightly decrease. A configuration for suppressing the decrease in productivity as much as possible in the present embodiment is illustrated in FIGS. 18 and 20.

The shorter the distance from each electrode pad 107 to the corresponding terminal 110 is, the shorter the distance from the first bonding point to the second bonding point is. Each electric connection member 106 thus becomes shorter, and the curvature of the loop shape of the electric connection member 106 thereby increases. As a result, the elastic deformation force of the electric connection member 106 increases. Then, in a case where the elastic deformation force increases, the reaction force lifting the electric wiring board 103 generated by the electric connection members 106 increases. Accordingly, providing the bending portions only in the electric connection members 106-12 can provide an effect of reducing the reaction force at a level almost equivalent to that in a case where the bending portions are provided in both of the electric connection members 106-12 and the electric connection members 106-13. Moreover, providing the bending portions only in the electric connection members 106-12 can reduce manufacturing cost from that in a case where the bending portions are provided in both of the electric connection members 106-12 and the electric connection members 106-13.

Eighth Embodiment

Figure 21:
FIG. 21 is a table illustrating various combinations of shapes of electric connection members in a liquid ejection unit according to an eighth embodiment of the present disclosure.
Figure 21:
Figure 21:
Figure 21:
Figure 21:
Figure 21:
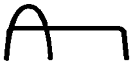
Figure 21:
Figure 21:
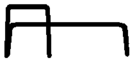
Figure 21:
Figure 21:
Figure 21:
Figure 21:
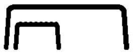

In the present embodiment, the electric connection members 106 adjacent to each other vary in the distance from the electrode pad 107 to the terminal 110 as in the sixth and fifth embodiments. Moreover, in a case where the electric connection members corresponding to the shorter distance are referred to as first electric connection members and the electric connection members corresponding to the longer distance are referred to as second electric connection members, the shapes of the first electric connection members and the second electric connection members can be classified as illustrated in the table of FIG. 21 depending on the height and the presence or absence of the bending portions.

Regarding the height, there are three cases including a case where the first electric connection members and the second electric connection members have the same height, a case where the first electric connection members are higher than the second electric connection members, and a case where the first electric connection members are lower than the second electric connection members. Regarding the presence or absence of the bending portions in the first electric connection members, there are two cases including a case where the first electric connection members include the bending portions and a case where the first electric connection members include no bending portion. Regarding the presence or absence of the bending portions in the second electric connection members, there are two cases including a case where the second electric connection members include the bending portions and a case where the second electric connection members include no bending portion. Accordingly, there are a total of twelve types of shapes 2101 to 2112. The sixth embodiment corresponds to the shape 2112. The seventh embodiment corresponds to the shape 2107.

The curvature of the second electric connection members can be reduced as compared to that in a case where the distance from the electrode pad 107 to the terminal 110 in each second electric connection member is aligned with the distance from the electrode pad 107 to the terminal 110 in each first electric connection member. Accordingly, in any of the shapes, the total value of the reaction force generated by all electric connection members can be reduced as compared to that in a case where the distances are aligned.

Moreover, providing the bending portions only in the first electric connection members alone can further reduce the total value of reaction force generated by all electric connection members. Similarly, providing the bending portions only in the second electric connection members alone can further reduce the total value of reaction force generated by all electric connection members.

Furthermore, since increasing the height of the first electric connection members alone can reduce the curvature thereof, this alone can further reduce the total value of reaction force generated by all electric connection members. Since increasing the height of the second electric connection members alone can reduce the curvature thereof, this alone can further reduce the total value of reaction force generated by all electric connection members.

Other Embodiments

In the aforementioned embodiments, each electric connection member 106 includes the first bending portion 106*c* and the second bending portion 106*d*. Meanwhile, in the present embodiment, each electric connection member 106 includes one bending portion or three or more bending portions. In a case where the electric connection member 106 includes one bending portion, an inner angle of the bending portion of the electric connection member 106 is an acute angle, and the first bonding portion, the second bonding portion, and the bending portion form a triangle. In a case where the electric connection member 106 includes three bending portions, the first bonding portion, the second bonding portion, and the three bending portions form a pentagon.

Although there are two types of distances from the electrode pad 107 to the terminal 110 in the sixth to ninth embodiments, in the present embodiment, there are three or more types of distances from the electrode pad 107 to the terminal 110. For example, in a case where there are three types of distances, the electric connection members may be arranged such that a short distance, an intermediate distance, and a long distance are repeated. Alternatively, the electric connection member may be arranged such that the short distance, the intermediate distance, the long distance, and the intermediate distance are repeated.

In the aforementioned embodiments, the ejection direction of the liquid, a normal direction of the surface (open portion surface 125) of the print element board 102 on which the electrode pads 107 are exposed, and a normal direction of the surface of the electric wiring board 103 on which the terminals 110 are exposed coincide with one another. However, for example, in a case where the electric wiring board 103 is an FPC, the normal direction of the surface of the electric wiring board 103 on which the terminals 110 are exposed may sometimes not coincide with the other two directions. Moreover, in a case where the open portion surface 125 is formed to be tilted, the normal direction of the open portion surface does not coincide with the other two directions. In a combination of the aforementioned two cases, the three directions described above vary from one another.

In these cases, a direction of a portion from the first bonding portion 106*a* to the first bending portion 106*c* in each electric connection member 106 may be made to coincide with the ejection direction of the liquid. Moreover, the direction of the portion from the first bonding portion 106*a* to the first bending portion 106*c* in each electric connection member 106 may be made to coincide with the normal direction of the open portion surface 125. Furthermore, the direction of the portion from the first bonding portion 106*a* to the first bending portion 106*c* in each electric connection member 106 may be made to coincide with the normal direction of the surface of the electric wiring board 103 on which the terminals 110 are exposed. Moreover, the direction of the portion from the first bonding portion 106*a* to the first bending portion 106*c* in each electric connection member 106 may be a direction close to any of the three directions described above.

A direction of a portion from the first bending portion 106*c* to the second bending portion 106*d* in each electric connection member 106 may be orthogonal to the ejection direction of the liquid. Moreover, the direction of the portion from the first bending portion 106*c* to the second bending portion 106*d* in each electric connection member 106 may be parallel to the open portion surface 125. Furthermore, the direction of the portion from the first bending portion 106*c* to the second bending portion 106*d* in each electric connection member 106 may be parallel to the surface of the electric wiring board 103 on which the terminals 110 are exposed. Moreover, the direction of the portion from the first bending portion 106*c* to the second bending portion 106*d* in each electric connection member 106 may be a direction close to any of the three directions described above.

A direction of a portion from the second bonding portion 106*b* to the second bending portion 106*d* in each electric connection member 106 may form an angle between 10 degrees and 90 degrees with respect to a plane orthogonal to the ejection direction of the liquid. Moreover, the direction of the portion from the second bonding portion 106*b* to the second bending portion 106*d* in each electric connection member 106 may form an angle between 10 degrees and 90 degrees with respect to the open portion surface 125. Furthermore, the direction of the portion from the second bonding portion 106*b* to the second bending portion 106*d* in each electric connection member 106 may form an angle between 10 degrees and 90 degrees with respect to the surface of the electric wiring board 103 on which the terminals 110 are exposed. Moreover, the direction of the portion from the second bonding portion 106*b* to the second bending portion 106*d* in each electric connection member 106 may be a direction close to any of the three directions described above.

In any of the embodiments, reducing the diameter of wires to be used as the electric connection members 106 reduces the reaction force of the wires, and can improve the effect of preventing the lifting of the electric wiring board. Specifically, the wire diameter may be selected according to a performance required for the liquid ejection unit 101, an electrode size, and a pitch between the electrodes.

The embodiments of the present disclosure have been described above. In recent years, a liquid ejection technique or an inkjet printing technique is increasingly applied to media other than paper media such as, for example, a printed circuit board. A liquid ejection unit to be used in such application and a liquid ejection apparatus in which the liquid ejection unit is mounted are required to have high reliability as industrial equipment, and the liquid ejection unit based on the present disclosure can satisfy this reliability requirement. Moreover, according to the liquid ejection unit of the present disclosure, it is possible to configure a liquid ejection printing apparatus that can maintain high print quality also in high-speed printing.

The liquid ejection unit based on the present disclosure can perform printing by using various types of liquid in addition to inks used in inkjet printing. Moreover, various types of processing (printing, processing, application, and irradiation) and the like can be performed on various types of media by using the liquid ejection unit based on the present disclosure. The media to be subjected to the processing herein includes so-called print media and various types of media to which liquid can be applied irrespective of whether the media have a sheet form or not, for example, paper, plastic, films, textile, metal, flexible substrates, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127262, filed on Aug. 9, 2022, which is hereby incorporated by reference herein in its entirety.

What is claimed is:

1. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other; and a sealing agent configured to cover an electric connection portion including at least the electric connection member, the electrode pad, and the terminal, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, the at least one bending point included in the link portion of the electric connection member includes a first bending point and a second bending point, out of the at least one bending point, the first bending point is the closest to the first connection end portion, and the second bending point is the closest to the second connection end portion, a distance between the first bending point and the first connection end portion of the electric connection member is shorter than a distance between the second bending point and the second connection end portion in a projection on a plane orthogonal to an ejection direction of the liquid, and the ejection direction of the liquid is replaced by a normal direction of a surface of the print element board on which the electrode pad is exposed, a normal direction of a surface of the electric wiring board on which the terminal is exposed, or a direction close to any of these three directions.

2. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other; and a sealing agent configured to cover an electric connection portion including at least the electric connection member, the electrode pad, and the terminal, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, the at least one bending point included in the link portion of the electric connection member includes a first bending point and a second bending point, out of the at least one bending point, the first bending point is the closest to the first connection end portion, and the second bending point is the closest to the second connection end portion, and the electric connection member includes a horizontal section between the first bending point and the second bending point, the horizontal section being substantially parallel to an open portion surface of the print element board on which the electrode pad is arranged.

3. The liquid ejection unit according to claim 2, wherein the horizontal section of the electric connection member is also substantially parallel to a surface of the electric wiring board on which the terminal is arranged.

4. The liquid ejection unit according to claim 2, wherein a length of the horizontal section of the electric connection member is between 50 μm and 500 μm.

5. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other; and a sealing agent configured to cover an electric connection portion including at least the electric connection member, the electrode pad, and the terminal, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, the at least one bending point included in the link portion of the electric connection member includes a first bending point and a second bending point, out of the at least one bending point, the first bending point is the closest to the first connection end portion, and the second bending point is the closest to the second connection end portion, and an angle of a segment connecting the second bending point and the second connection end portion of the electric connection member with respect to a surface of the electric wiring board on which the terminal is arranged is between 10 degrees and 90 degrees.

6. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other; and a sealing agent configured to cover an electric connection portion including at least the electric connection member, the electrode pad, and the terminal, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, a position of the second connection end portion of each of the plurality of the electric connection members is shifted in an extending direction of the electric wiring board, with respect to that of the adjacent electric connection member, the electric connection member in which the second connection end portion is separated from the first connection end portion by a distance shorter than a predetermined distance includes at least one bending point in the link portion, and the electric connection member in which the second connection end portion is separated from the first connection end portion by a distance longer than the predetermined distance does not include the bending point in the link portion.

7. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other;

a sealing agent configured to cover an electric connection portion including at least the electric connection member, the electrode pad, and the terminal; and at least a second type of an electric connection member including a first connection end portion connected to the electrode pad of the print element board, a second connection end portion connected to the terminal of the electric wiring board, and a link portion configured to link the first connection end portion and the second connection end portion to each other, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, a position of the second connection end portion of each of the plurality of the electric connection members is shifted in an extending direction of the electric wiring board, with respect to that of the adjacent electric connection member, and the at least the second type of the electric connection member does not include at least one bending point in the link portion.

8. A liquid ejection unit comprising:

a print element board including an ejection port configured to eject liquid, an energy generating element configured to generate energy for ejecting the liquid from the ejection port, and an electrode pad electrically connected to the energy generating element;

an electric wiring board joined to the print element board and including a terminal for electrical connection to the electrode pad;

an electric connection member including a first connection end portion connected to the electrode pad of the print element board, a second connection end portion connected to the terminal of the electric wiring board, and a link portion configured to link the first connection end portion and the second connection end portion to each other; and a sealing agent configured to cover an electric connection portion including at least the electric connection member, the electrode pad, and the terminal, wherein the electric connection member includes at least one bending point in the link portion, the print element board includes a plurality of the energy generating elements and a plurality of the electrode pads, and the energy generating elements and the electrode pads are electrically connected to one another, respectively, the electric wiring board includes a plurality of the terminals corresponding to the plurality of electrode pads, a plurality of the electric connection members electrically connecting the electrode pads and the terminals to one another, respectively, are provided, a maximum height of each of the plurality of electric connection members from an open portion surface of the print element board on which the electrode pads are arranged varies from that of the adjacent electric connection member, in two of the electric connection members adjacent to each other, the one with the higher maximum height has a shorter length in the direction of extension of the electrical connection members than that of the other, and the electric connection member is plastically deformed at at least one bending point included in the at least one bending point.

9. The liquid ejection unit according to claim 1, wherein the energy generating element is a piezoelectric element.

* * * * *